United States Patent
Kim et al.

(10) Patent No.: US 11,200,018 B2
(45) Date of Patent: Dec. 14, 2021

(54) ELECTRONIC DEVICE AND METHOD FOR SHARING SCREEN DATA

(71) Applicant: SAMSUNG ELECTRONICS CO., LTD., Suwon-si (KR)

(72) Inventors: Hyunkyoung Kim, Suwon-si (KR); Hongjin Park, Suwon-si (KR); Byungsung Kang, Suwon-si (KR); Kwanguk Kim, Suwon-si (KR); Minki Kim, Suwon-si (KR); Bongkyu Kim, Suwon-si (KR); Jinbong Ryu, Suwon-si (KR); Jongmoon Park, Suwon-si (KR); Jihwa Park, Suwon-si (KR); Junui Seo, Suwon-si (KR); Sanghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 16/282,697

(22) Filed: Feb. 22, 2019

(65) Prior Publication Data

US 2019/0265938 A1  Aug. 29, 2019

(30) Foreign Application Priority Data

Feb. 23, 2018  (KR) .................. 10-2018-0022250

(51) Int. Cl.
*G06F 3/14*      (2006.01)
*G06F 3/0481*    (2013.01)
(Continued)

(52) U.S. Cl.
CPC ........ *G06F 3/1423* (2013.01); *G06F 3/04817* (2013.01); *G06F 3/1454* (2013.01);
(Continued)

(58) Field of Classification Search
None
See application file for complete search history.

(56) References Cited

U.S. PATENT DOCUMENTS 9,203,813 B2   12/2015  Matsunaga
9,392,315 B1    7/2016  Lang et al.
(Continued)

FOREIGN PATENT DOCUMENTS

AU   2015302298 A1   3/2017
KR   10-1545289      8/2015
WO   2017/003007 A1  1/2017

OTHER PUBLICATIONS

Search Report and Written Opinion dated Jun. 20, 2019 in counterpart International Patent Application No. PCT/KR2019/002219.
(Continued)

*Primary Examiner* — Brandon S Hoffman
(74) *Attorney, Agent, or Firm* — Nixon & Vanderhye P.C.

(57) ABSTRACT

An electronic device is disclosed. An electronic device comprises a display, a communication circuit configured to communicate with a first peripheral device, a memory configured to store first authentication information associated with the first peripheral device, and a processor, wherein the processor is configured to control the electronic device to: broadcast a first message via the communication circuit, receive a connection request message from the first peripheral device receiving the first message, authenticate the first peripheral device based on the first authentication information associated with the first peripheral device in response to the reception of the connection request message, and transmit screen data being displayed on the display to the first peripheral device via the communication circuit based on the authentication being valid.

20 Claims, 11 Drawing Sheets

(51) Int. Cl.
*G06F 21/44* (2013.01)
*H04L 29/06* (2006.01)
*H04W 12/069* (2021.01)

(52) U.S. Cl.
CPC .......... *G06F 21/44* (2013.01); *H04L 63/0823* (2013.01); *H04W 12/069* (2021.01); *G09G 2358/00* (2013.01); *G09G 2370/02* (2013.01); *G09G 2370/16* (2013.01)

(56) References Cited

U.S. PATENT DOCUMENTS

| | | | |
|---|---|---|---|
| 9,509,668 B2 | 11/2016 | Matsunaga | |
| 9,648,099 B2 | 5/2017 | Lee | |
| 10,057,650 B2 | 8/2018 | Kim et al. | |
| 10,165,108 B1 * | 12/2018 | Douglas | G06Q 30/0267 |
| 2007/0123243 A1 | 5/2007 | Suito | |
| 2013/0074117 A1 * | 3/2013 | Song | H04N 21/235 |
| | | | 725/31 |
| 2013/0238702 A1 * | 9/2013 | Sheth | H04L 67/38 |
| | | | 709/204 |
| 2014/0229852 A1 | 8/2014 | Lee | |
| 2015/0143119 A1 | 5/2015 | Matsunaga | |
| 2016/0044004 A1 | 2/2016 | Matsunaga | |
| 2016/0182613 A1 * | 6/2016 | Brune | G06F 1/1698 |
| | | | 709/217 |
| 2016/0239250 A1 | 8/2016 | Kim et al. | |
| 2017/0150227 A1 | 5/2017 | Kim et al. | |
| 2017/0302876 A1 | 10/2017 | Orad et al. | |
| 2018/0205983 A1 | 7/2018 | Lee et al. | |

OTHER PUBLICATIONS

Extended Search Report dated Jul. 4, 2019 in counterpart European Patent Application No. 19158928.2.

* cited by examiner

[WHEN VOICE ENCRYPTION IS SET] [WHEN VOICE ENCRYPTION IS NOT SET]

910

920

912

922

ELECTRONIC DEVICE AND METHOD FOR SHARING SCREEN DATA

CROSS-REFERENCE TO RELATED APPLICATION

This application is based on and claims priority under 35 U.S.C. § 119 to Korean Patent Application No. 10-2018-0022250, filed on Feb. 23, 2018, in the Korean Intellectual Property Office, the disclosure of which is incorporated by reference herein its entirety.

BACKGROUND

1. Field

The present disclosure relates to a screen mirroring technique for sharing screen data.

2. Description of Related Art

As a mobile device (e.g. a smartphone, a tablet PC) becomes smaller, a display included therein is becoming smaller. Thus, the mobile device may provide a screen mirroring function that allows a small screen to be viewed on a different sized display. Alternatively, the mobile device may provide a screen mirroring that allows a screen thereof to be viewed on a plurality of devices in an IoT environment.

When a screen mirroring function is used, information displayed on a screen of a mobile device is exposed to other electronic devices, so that it is difficult for a user's personal information to be protected. Accordingly, the screen mirroring function is performed in a manner that the mobile device providing screen data requests a screen mirroring. However, in this case, the screen mirroring function is only available when the user has the mobile device in person.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure address at least the above-mentioned problems and/or disadvantages and provide at least the advantages described below. Accordingly, an aspect of the present disclosure is to provide an electronic device that allows a screen mirroring function to be requested from not only a mobile device providing screen data, but also an electronic device receiving screen data.

In accordance with an aspect of the present disclosure, an electronic device comprises a display, a communication circuit configured to communicate with a first peripheral device, a memory configured to store first authentication information associated with the first peripheral device, and a processor, wherein the processor is configured to control the electronic device to: broadcast a first message via the communication circuit, receive a connection request message from the first peripheral device receiving the first message in response to the reception of the connection request message, authenticate the first peripheral device based on the first authentication information associated with the first peripheral device, and transmit screen data being displayed on the display to the first peripheral device via the communication circuit based on the authentication being valid.

In accordance with another aspect of the present disclosure, a method performed by an electronic device comprises broadcasting a first message via a communication circuit, receiving a connection request message from the first peripheral device receiving the first message in response to the reception of the connection request message, authenticating the first peripheral device based on first authentication information associated with the first peripheral device, and transmitting screen data being displayed on a display of the electronic device to the first peripheral device via the communication circuit based on the authentication being valid.

According to embodiments disclosed herein, the screen mirroring function of the electronic device may be initiated at the request of the external device.

According to embodiments disclosed herein, personal information of the user of the electronic device may be protected through the authentication procedure and various setting items.

In addition, various effects that are directly or indirectly understood through this document may be provided.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
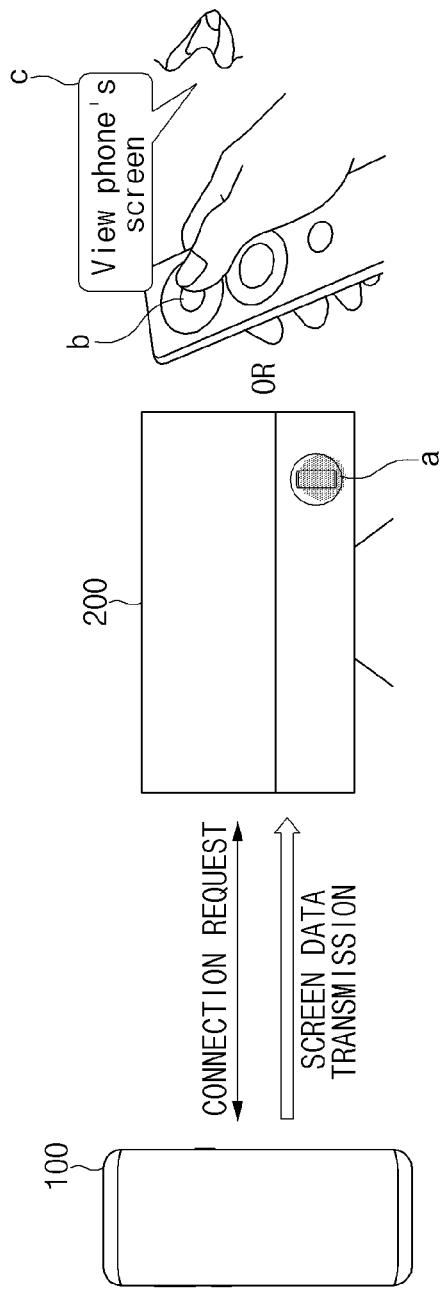
FIG. 1 is a diagram illustrating an example operation environment of an electronic device according to an embodiment.

FIG. 1 is a diagram illustrating an example operation environment of an electronic device according to an embodiment.

In an embodiment, an electronic device 100 may perform a screen mirroring function with a peripheral device 200. The screen mirroring function may, for example, refer to as a function of displaying the same screen as a screen displayed on the electronic device 100 on the peripheral device 200.

For example, the electronic device 100 may include a small electronic device, such as, for example, and without limitation, a smart phone, a tablet PC, or the like. The peripheral device 200 may, for example, and without limitation, include a home appliance having a display (for example, a TV, a refrigerator, or the like). However, the present disclosure is not limited to above, the screen mirroring may be performed between the electronic devices 100, and/or between the peripheral devices 200 disclosed herein.

In order to perform screen mirroring function, the electronic device 100 may transmit a connection request message to the peripheral device 200. The peripheral device 200 may transmit the connection request message to the electronic device 100. In the former case, the screen of the electronic device 100 may be shared at a request of an external device, so that there is a risk of exposure of personal information.

For example, when a connection request command is issued, the peripheral device 200 may transmit a connection request message to the electronic device 100. The connection request command may be generated, for example, and without limitation, when a physical button provided on the peripheral device 200 is pressed (a), a button on a remote control is pressed (b), an instruction utterance (e.g., voice command) is received (c), or the like.

In an embodiment, when the electronic device 100 receives the connection request message from the peripheral device 200, authentication with respect to the peripheral device 200 may be performed. For example, the electronic device 100 may perform authentication to check whether the peripheral device 200 is authorized to perform the screen mirroring function. The electronic device 100 may protect personal information of a user of the electronic device 100 by performing the authentication.

When the electronic device 100 completes the authentication with respect to the peripheral device 200, the electronic device 100 may initiate the screen mirroring with the peripheral device 200. The electronic device 100 may transmit screen data to the peripheral device 200. The peripheral device 200 may display the received screen data.

Figure 2:
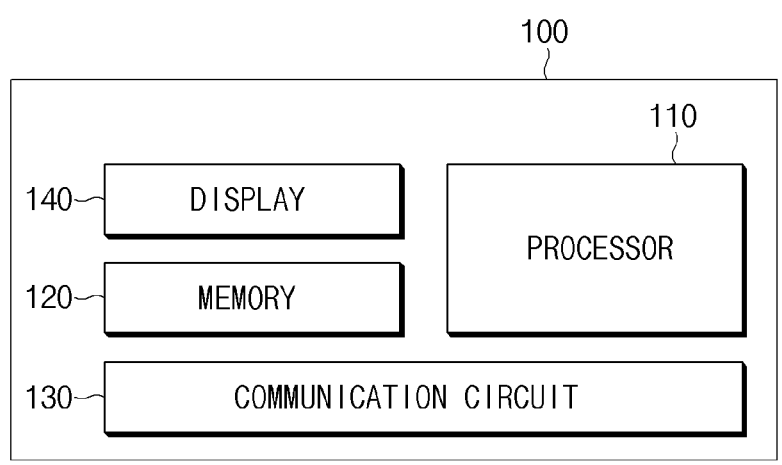
FIG. 2 is a block diagram illustrating an example electronic device according to an embodiment.

FIG. 2 is a block diagram illustrating an example electronic device according to an embodiment.

In an embodiment, the electronic device 100 may include a processor (e.g., including processing circuitry) 110, a memory 120, a communication circuit 130, and a display 140. The processor 110 may include various processing circuitry and control overall operation of the electronic device 100. The processor 110 may be referred to as, for example, an application processor.

The memory 120 may store instructions for the operation of the processor 110. When the instructions stored in the memory 120 are executed, the processor 110 may perform various operations and/or cause the electronic device to perform the various operations.

The memory 120 may store authentication information associated with the peripheral device 200. The electronic device 100 may authenticate the peripheral device 200 that is to perform the screen mirroring, using the authentication information stored in the memory 120. For example, the authentication information may be received from the peripheral device 200 and stored. In various embodiments, the user may select the peripheral device 200 to allow the screen mirroring and obtain authentication information. The electronic device 100 authenticates the peripheral device 200 using the obtained authentication information, thereby performing device-to-device authentication. The authentication procedure may be performed without an involvement of a separate server.

The communication circuit 130 may be configured to communicate with the peripheral device 200. The electronic device 100 may transmit and receive data with the peripheral device 200 via the communication circuit 130. For example, the electronic device 100 may transmit the screen data to the peripheral device 200 via the communication circuit 130. The screen data may be referred to, for example, as data associated with a screen displayed on the display 140 of the electronic device 100. The peripheral device 200 may display the same screen as the screen displayed on the electronic device 100 based on the received screen data. For example, the communication circuit 130 may be configured to communicate with the peripheral device 200 via Bluetooth, but the disclosure is not limited thereto.

In various embodiments, the peripheral device 200 may be implemented including all or some of the components of the electronic device 100 of FIG. 2. The peripheral device 200, like the electronic device 100, may include, for example, and without limitation, at least a processor, a memory, a communication circuit, a display, and the like.

Figure 3:
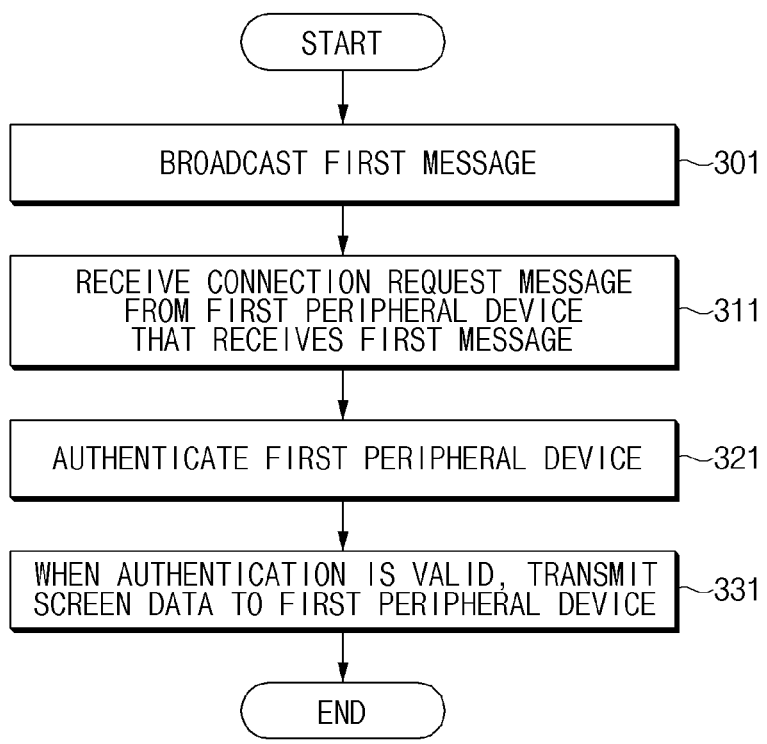
FIG. 3 is a flowchart illustrating an example screen mirroring method depending on a request from a peripheral device according to an embodiment.

FIG. 3 is a flowchart illustrating an example screen mirroring method depending on a request from a peripheral device according to an embodiment.

With reference to FIG. 3, a screen mirroring method by a request of the peripheral device 200 according to an embodiment may, for example, and without limitation, include operation 301, 311, 321 and 331. The operation 301, 311, 321 and operation 331 may be, for example, performed by the electronic device 100 shown in FIG. 2. Each operation of the operation 301, 311, 321 and operation 331 may be, for example, implemented with instructions that may be executed by the processor 110 of the electronic device 100. The instructions may be stored in, for example, and without limitation, a computer readable recording medium, the memory 120 of the electronic device 100 shown in FIG. 2, or the like. Hereinafter, among a description of the operation 301, 311, 321 and 331, a description overlapping with the description of FIG. 2 may be omitted.

In operation 301, the electronic device 100 may broadcast a first message via the communication circuit 130. For example, the peripheral device 200 within a range of communication with the electronic device 100 may receive the first message.

In an embodiment, the electronic device 100 may broadcast the first message every predetermined period. The electronic device 100 may broadcast the first message repeatedly at constant periods, thereby informing the peripheral device 200 of availability of the screen mirroring function. For example, the first message may include, for example, and without limitation, operating system (OS) information of the electronic device 100, type information, name of the electronic device 100, or the like.

In an embodiment, the electronic device 100 may broadcast the first message based, for example, and without limitation, on a Bluetooth communication, or the like. In the case of Bluetooth, the first message may include a Bluetooth MAC address.

In operation 311, the electronic device 100 may receive a connection request message from the first peripheral device 200 that received the first message.

The peripheral device 200 located near the electronic device 100 may receive the first message. For example, when the first message is broadcasted based on the Bluetooth communication, the peripheral device 200 located within a reach of the Bluetooth communication signal may receive the first message. When the peripheral device 200 receives the first message, it may be determined that the electronic device 100 capable of screen mirroring is nearby.

In various embodiments, when a plurality of peripheral devices 200 exist near the electronic device 100, all of the plurality of peripheral devices 200 may receive the first message. Hereinafter, a case where the connection request message is received from a first peripheral device 200 among the plurality of peripheral devices 200 is described as an example, but it will be understood that the disclosure is not limited thereto.

In various embodiments, when the peripheral device 200 receives the first message, an interface indicating that screen mirroring is available may be displayed on the display (e.g. the display 140 of FIG. 2). When the peripheral device 200 receives a screen mirroring request (e.g., physical button input, utterance input, etc.) depending on the interface, a connection request message may be transmitted to the electronic device 100.

In operation 321, in response to the reception of the connection request message, the electronic device 100 may perform authentication with respect to the first peripheral device 200 based, for example, on first authentication information associated with the first peripheral device 200.

The electronic device 100 may, for example, authenticate the first peripheral device 200 using the first authentication information stored in advance in the memory 120. The first authentication information may, for example, be referred to as previously stored information to authenticate the first peripheral device. For example, the first authentication information may include an authentication certificate obtained from the first peripheral device. An embodiment related to this is described in greater detail below with reference to FIG. 4.

In operation 331, when the authentication is valid, the electronic device 100 may transmit screen data to the first peripheral device 200 via the communication circuit 130. The first peripheral device 200 may display the same screen as the screen of the electronic device 100 on the display (for example, the display 140) based on the received screen data.

Figure 4:
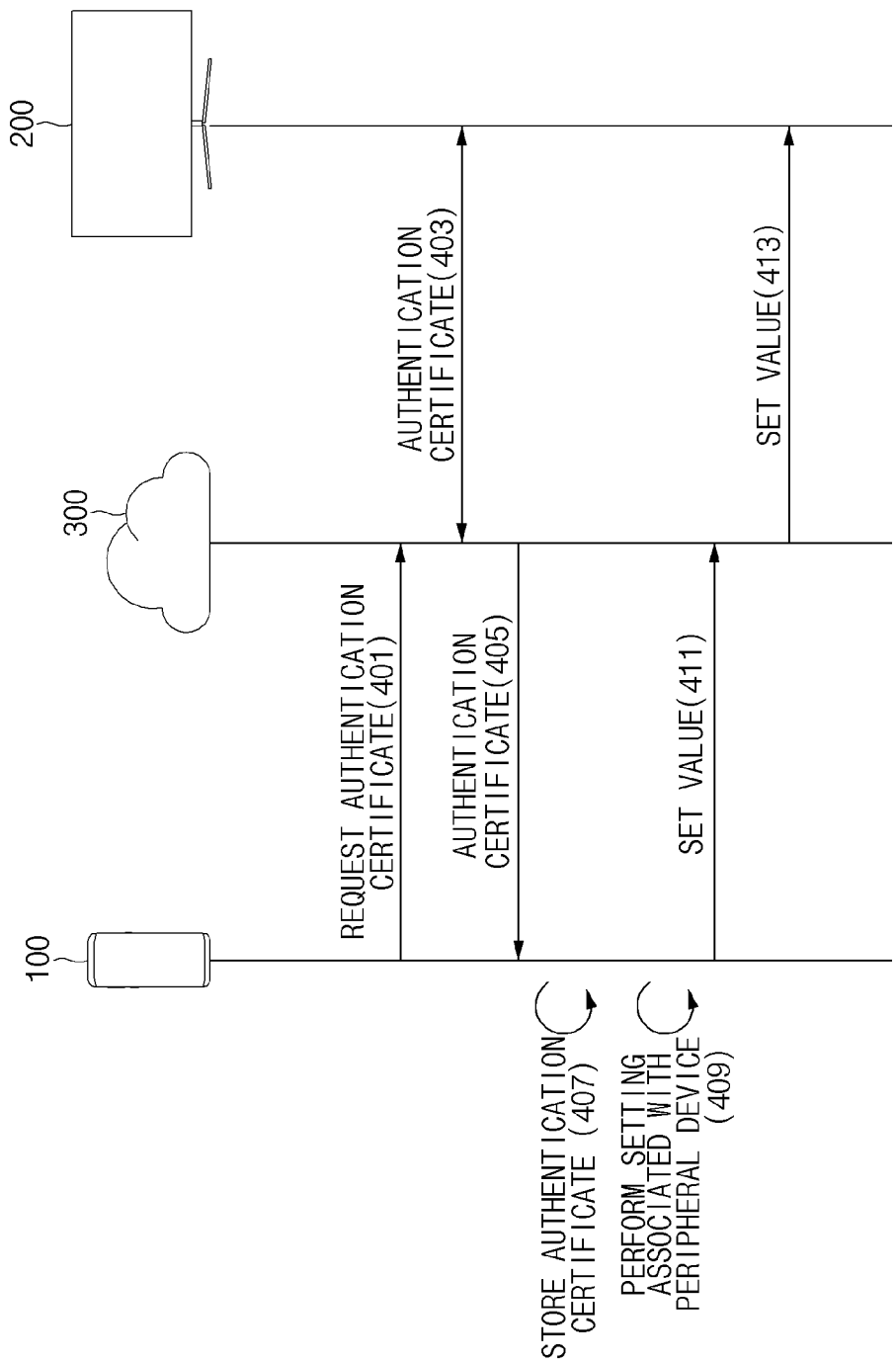
FIG. 4 is a signal flow diagram illustrating an example method for exchanging an authentication certificate between an electronic device and a peripheral device according to various embodiments.

FIG. 4 is a signal flow diagram illustrating an example method for exchanging an authentication certificate between an electronic device and a peripheral device according to various embodiments.

In various embodiments, the authentication information associated with the peripheral device 200 may, for example, include an authentication certificate received from the peripheral device 200. The electronic device 100 may perform the authentication with respect to the peripheral device 200 based on the authentication certificate stored in the memory 120.

In an embodiment, the electronic device 100 may obtain the authentication certificate of the peripheral device 200 from the peripheral device 200, and a server 300 that relays communication with the peripheral device 200. The electronic device 100 may make a request for the authentication certificate associated with the peripheral device 200 to the server 300 (401). For example, the electronic device 100 may request to the server 300 in advance the authentication certificate of the peripheral device 200 that the electronic device 100 wants to share the screen thereof with.

In an embodiment, the server 300 may exchange the authentication certificate with the peripheral device 200 (403) and may transmit the authentication certificate to the electronic device 100 (405). The electronic device 100 may store the received authentication certificate (407). When the connection request message is received from the peripheral device 200, thereafter the electronic device 100 may authenticate the peripheral device 200, using the stored authentication certificate.

In various embodiments, after receiving the authentication certificate, the electronic device 100 may perform a setting associated with the peripheral device 200 (409). The electronic device 100 may transmit set value associated with the performed setting to the server 300 (411), and the server 300 may transmit the set value to the peripheral device 200 (413).

For example, the electronic device 100 may set an on/off value of the screen mirroring function with the peripheral device 200. Even when receiving the authentication certificate of the peripheral device 200, the electronic device 100 may determine whether to transmit the screen data based on the set value. In various embodiments, the electronic device 100 may transmit the set value to the server 300. In this example, when the server 300 mediates communication with the peripheral device 200, the server 300 may perform an operation depending on a set value previously received.

Figure 5:
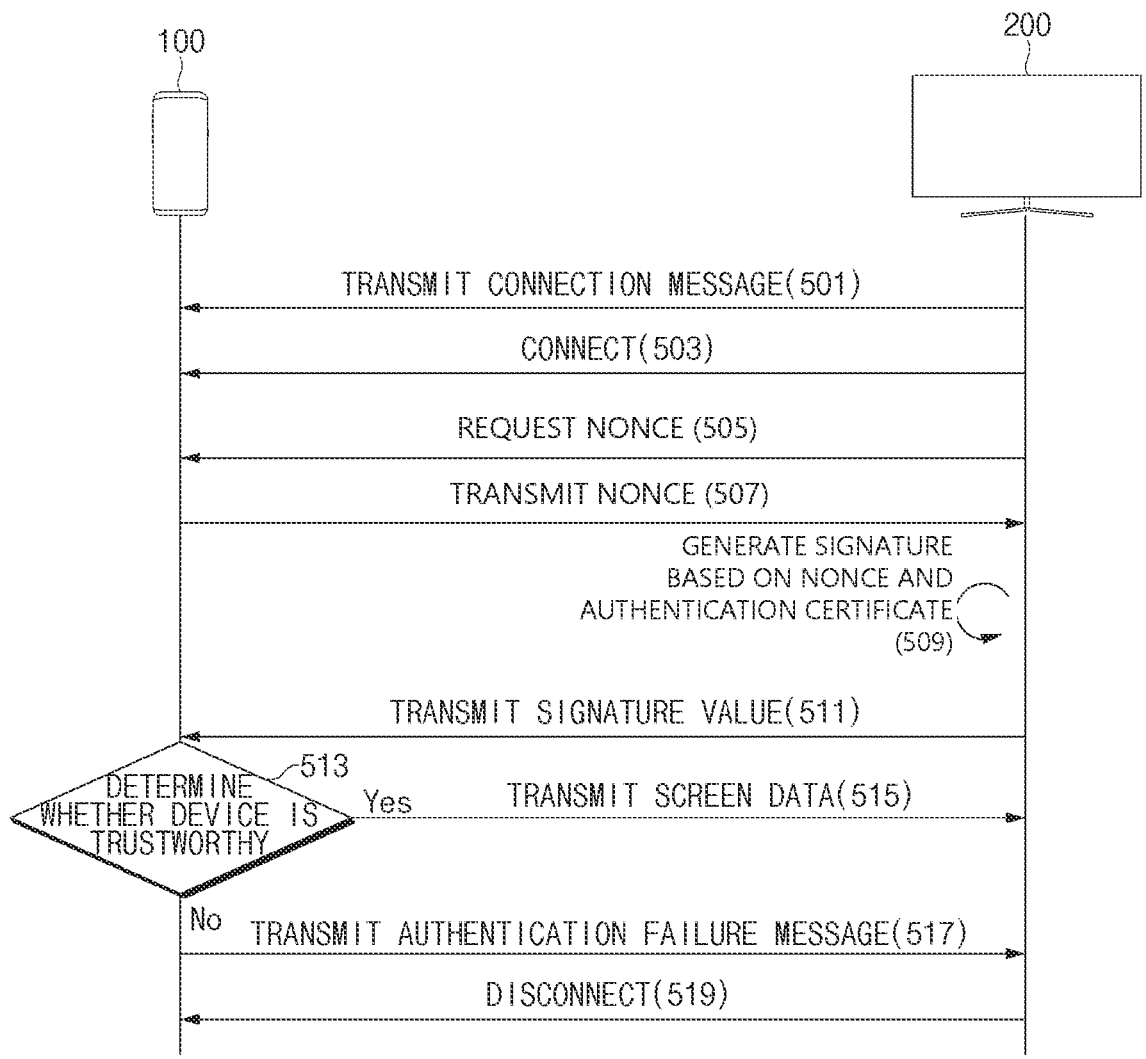
FIG. 5 is a signal flow diagram illustrating an example method for authenticating a peripheral device according to various embodiments.

FIG. 5 is a signal flow diagram illustrating an example method for authenticating a peripheral device according to various embodiments.

When the electronic device 100 receives the connection request from the peripheral device 200 (501), the peripheral device 200 may be authenticated using the previously stored authentication certificate. Thus, a device to device connection between the electronic device 100 and the peripheral device 200 may be performed without the involvement of an external server.

In an embodiment, when the electronic device 100 receives the connection request message from the peripheral device 200, a connection with the peripheral device 200 may be established (503). For example, when the electronic device 100 and the peripheral device 200 perform the Bluetooth communication, the peripheral device 200 may establish the connection with the electronic device 100 using the Bluetooth MAC address of the electronic device 100.

In an embodiment, the peripheral device 200 may request a nonce value from the electronic device 100 (505). The nonce value may refer, for example, to an arbitrarily generated one-time number. The electronic device 100 may generate the nonce value and transmit the nonce value to the peripheral device 200 (507). The peripheral device 200 may generate a signature using the nonce and the authentication certificate (509). For example, the peripheral device 200 may encrypt the nonce value using the authentication certificate. The encrypted value may be referred to, for example, as a signature. The peripheral device 200 may transmit the signature value to the electronic device 100 (511).

In an embodiment, the electronic device 100 may determine whether the peripheral device 200 is trustworthy, using the received signature value and the previously stored authentication certificate (513). For example, the electronic device 100 may decrypt the signature value using the previously stored authentication certificate and compare the decrypted value with the previously transmitted nonce value. When both have the same value, the electronic device 100 may determine that the peripheral device 200 is trustworthy. When both have different values, the electronic device 100 may determine that the peripheral device 200 is an untrustworthy.

When the electronic device 100 determines that the peripheral device 200 is trustworthy, the screen data may be transmitted to the peripheral device 200 (515). When the electronic device 100 determines that the peripheral device 200 is untrustworthy, an authentication invalid message may be transmitted to the peripheral device 200 (517). The peripheral device 200 may disconnect the connection with the electronic device 100 established in operation 503 (519).

Figure 6:
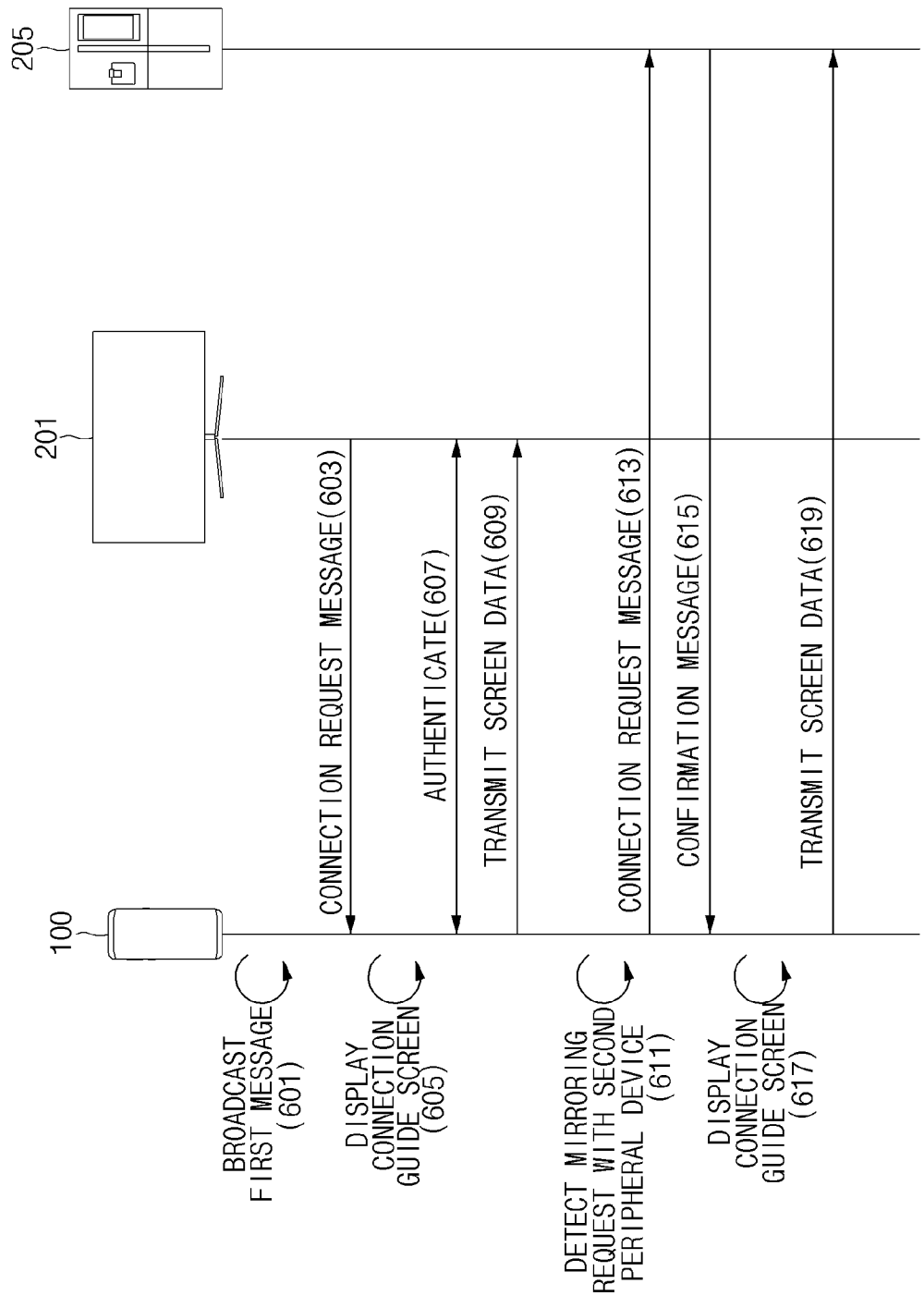
FIG. 6 is a signal flow diagram illustrating an example method for screen mirroring with a plurality of peripheral devices according to various embodiments.
Figure 7:
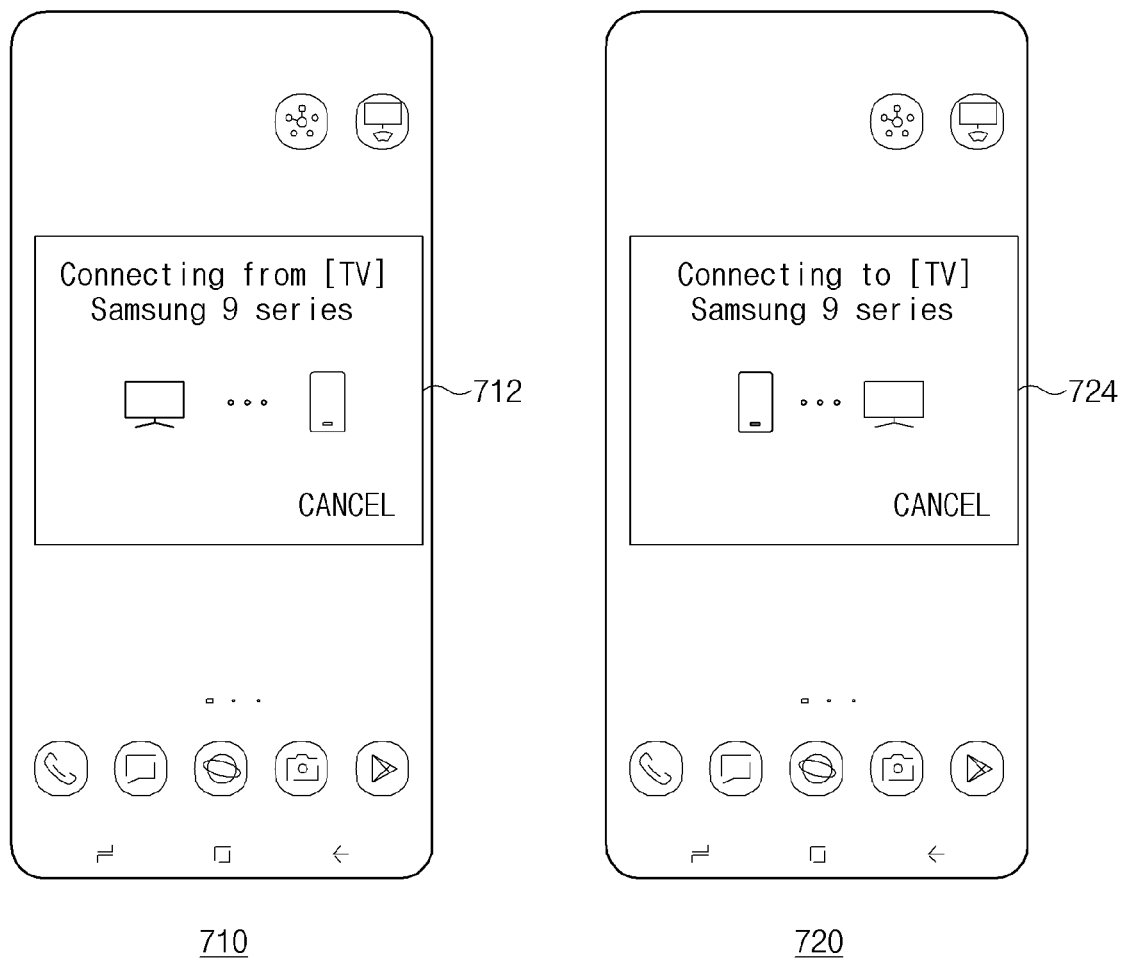
FIG. 7 is a diagram illustrating an example of a connection screen displayed on an electronic device according to an embodiment.

FIG. 6 is a signal flow diagram illustrating an example method for screen mirroring with a plurality of peripheral devices according to various embodiments. FIG. 7 is a diagram illustrating an example of a connection screen displayed on an electronic device according to an embodiment.

In various embodiments, the electronic device 100 may receive the connection request from the peripheral device 200, but the electronic device 100 may transmit the connection request to the peripheral device. For example, with reference to FIG. 6, an example is illustrated in which the electronic device 100 receives the connection request from a first peripheral device 201 (e.g. TV, or the like), and transmits the connection request to a second peripheral device 205 (e.g. refrigerator, or the like). For example, screen mirroring with the first peripheral device 201 transmitted the connection request may be performed similarly to the above-described FIG. 3 to FIG. 5 (operation 601, 603, 605, 607 and operation 609), and a description thereof will not be repeated here.

In an embodiment, the electronic device 100 may detect a screen mirroring request with respect to the second peripheral device 205 (611). For example, the request of the electronic device 100 may be generated by the user of the electronic device 100. When the electronic device 100 detects the request, it may transmit a connection request message to the second peripheral device 205 (613). When the electronic device 100 receives a confirmation message from the second peripheral device 205 (615), the electronic device 100 may transmit screen data to the second peripheral device 205 (619).

In an embodiment, the electronic device 100 may display a connection guide screen during connection with the peripheral device 200 (605, 617). For example, the electronic device 100 may provide a different connection guide screen when the connection request is received from the peripheral device 200, and when the connection request is transmitted to the peripheral device 200.

For example, the connection guide screen may include information and connection status associated with the peripheral devices 201, 205, and may be displayed via the display 140.

With reference to a screen 710, it may be displayed via a notification window 712 that a connection request is received from a 'Samsung 9 Series TV' which is the first peripheral device 201, and the connection is currently in progress.

In an embodiment, when the electronic device 100 transmits a connection request to the second peripheral device 205, the electronic device 100 may display a notification window 724 such as a screen 720. It may be displayed via the notification window 724 that the electronic device 100 transmitted a connection request to the 'Samsung 9 Series TV', and the connection is currently in progress.

The notification windows 712 and 724 may be displayed differently depending on a transmitter, so that information about the transmitter may be provide to the user.

Figure 8:
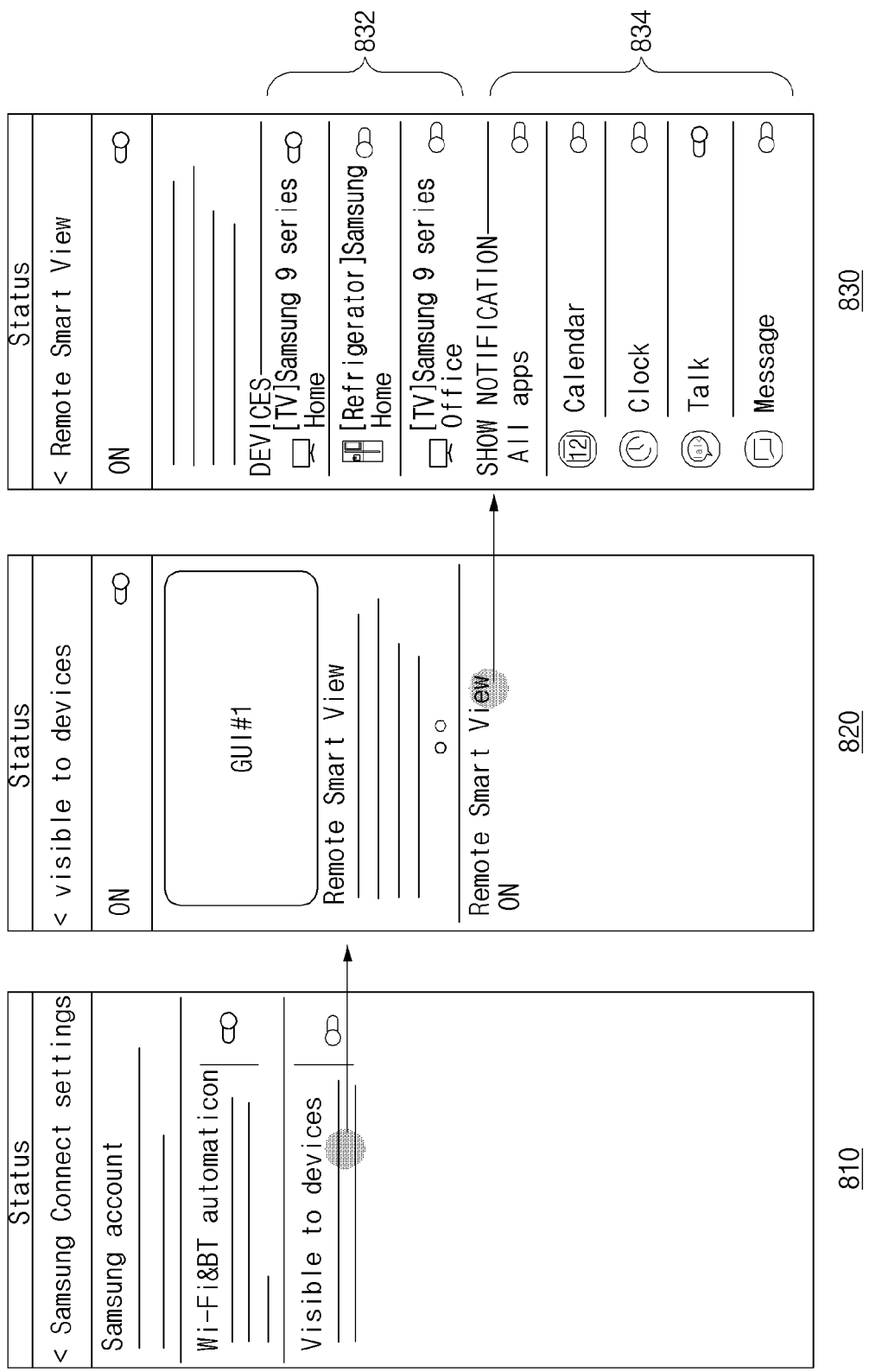
FIG. 8 is a diagram illustrating an example of a setting screen displayed on an electronic device according to an embodiment.

FIG. 8 is a diagram illustrating an example of a setting screen displayed on an electronic device according to an embodiment.

In an embodiment, the electronic device 100 may, for example, and without limitation, display a setting screen such as a screen 810, 820 and 830 with respect to the screen mirroring function. The electronic device 100 may receive setting information from the user based on the displayed setting screen. The setting information input on the setting screen may be stored in the memory 120 of the electronic device 100.

With reference to the screen 810, the setting screen may include a button for setting on and off for the screen mirroring function (for example, visible to devices). When the screen mirroring function is turned on by the button, the electronic device 100 may broadcast a first message, indicating that the screen mirroring is available, to the peripheral device 200. The electronic device 100 may be in a state capable of receiving a connection request from the peripheral device 200 located nearby. A setting screen may include a menu item for the screen mirroring (for example, visible to devices). With reference to the screen 820, a screen 820 including a GUI related to the screen mirroring function may be displayed in response to a selection of the menu item.

With reference to the screen 830, a detailed setting screen for the screen mirroring function is shown by way of non-limiting example. The screen 830 may include a list 832 of peripheral devices 200 capable of the screen mirroring. For example, the electronic device 100 may display a peripheral device corresponding to the stored authentication certificate as a peripheral device connectable to the electronic device.

In various embodiments, the electronic device 100 may store a plurality of authentication certificates in the memory 120. The plurality of authentication certificates may be referred to as authentication certificates received from a plurality of different peripheral devices. The electronic device 100 may display the plurality of peripheral devices 200 corresponding to the plurality of authentication certificates stored in the memory 120 as displayable on the display 140.

In various embodiments, the electronic device 100 may store setting information regarding whether to allow the screen mirroring function with respect to the plurality of peripheral devices 200. For example, when the electronic device 100 receives the connection request from the peripheral device 200, even though the authentication is valid, whether to transmit the screen data is determined based on the setting information. The electronic device 100 may be configured to transmit the screen data to the peripheral device 200, only when the screen mirroring with respect to the peripheral device 200 is allowed based on the setting information. Thus, even when the electronic device 100 stores an authentication certificate for a particular peripheral device 200, whether to allow the screen mirroring function with respect to the particular peripheral device 200 may be determined depending on the setting information.

In various embodiments, when a notification event associated with the execution of the function of the electronic device 100 occurs, the electronic device 100 may transmit data associated with the notification event to the peripheral device 200. The peripheral device 200 may provide the notification event via the display (e.g. the display 140) using the data associated with the notification event. For example, the peripheral device 200 may output a screen associated with the notification event using the data.

The electronic device 100 may store setting information on whether to share the notification event associated with a specific function with the peripheral device 200 via the screen mirroring function. For example, the setting information may include setting information on whether to transmit data associated with the notification event to the specific peripheral device 200. The electronic device 100 may transmit the data to the peripheral device 200 only when sharing of the notification event is allowed based on the setting information.

For example, when a chat message is received to the electronic device 100, and the chat message is popped up, and when an event notifying the chat message is shared via the peripheral device 200, the chat message may be disclosed to anyone other than the user of the electronic device 100, so that there is a risk of disclosure of personal information. The user may enhance privacy by setting whether to share a notification event associated with a specific function execution with the peripheral device 200.

In various embodiments, the memory 120 of the electronic device 100 may store a plurality of application programs. The electronic device 100 may store setting information on whether to transmit data associated with the notification event with respect to each of the plurality of application programs.

With reference to the screen 830, setting information 834 about whether to share notifications to each of the application programs may be stored in the electronic device 100. The user may decide whether to share a notification message associated with a specific application program.

Figure 9:
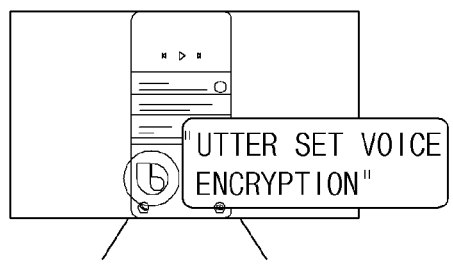
FIG. 9 is a diagram illustrating an example method for unlocking an electronic device during screen mirroring according to various embodiments.
Figure 9:
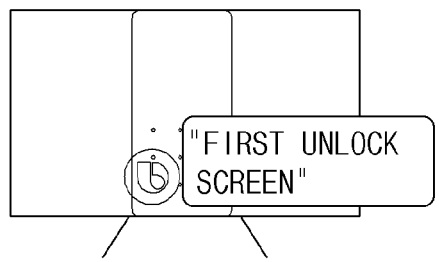
Figure 9:
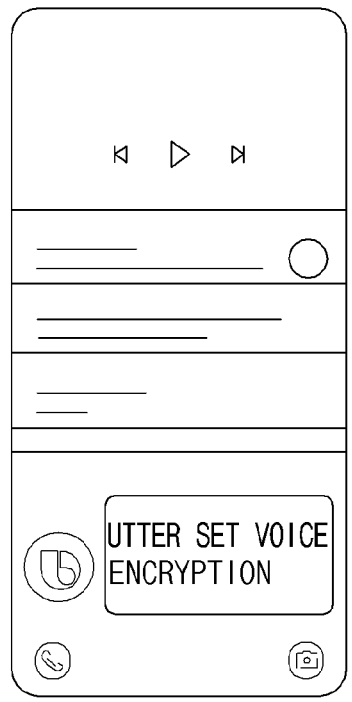
Figure 9:
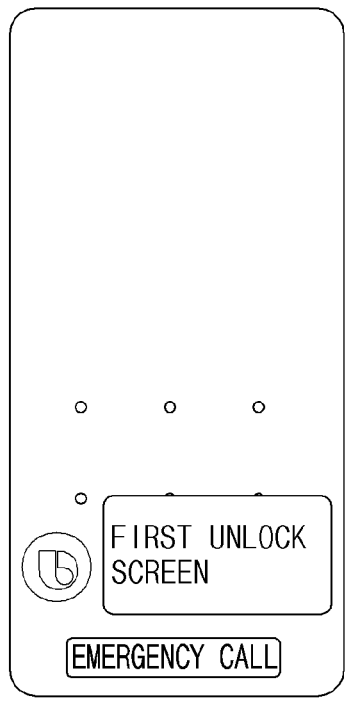

FIG. 9 is a diagram illustrating an example method for unlocking an electronic device during screen mirroring according to various embodiments.

In various embodiments, when the screen mirroring request is received from the peripheral device 200 when the electronic device 100 is in a locked state, the screen of the electronic device 100 in the locked state may be displayed on the peripheral device 200. The electronic device 100 may, then, receive authentication information associated with the electronic device 100 from the connected peripheral device 200. The electronic device 100 may change the locked state thereof to an unlocked state thereof based on the received authentication information. For example, the authentication information associated with the electronic device may, for example, and without limitation, be a specific content utterance, a specific numeral string, or the like.

With reference to FIG. 9, for example, when a voice encryption is configured to the electronic device 100, the electronic device 100 may display a screen 912, and the peripheral device 200 may display a screen 910. The user may utter the voice encryption with respect to the electronic device 100 or the peripheral device 200 for unlocking. When the user utters to the peripheral device 200, the peripheral device 200 may transmit the received utterance to the electronic device 100. The electronic device 100 may change the locked state to the unlocked state based on the received utterance. In another example, when the numeral string code is configured to the electronic device 100, the peripheral device 200 may transmit a numeral string received by an input device, such as a remote control, to the electronic device 100.

In various embodiments, when the peripheral device 200 may not be able to unlock the locked state (e.g. when a pattern-lock is set), the peripheral device 200 may display a screen 920, and direct the user to unlock via the electronic device 100. The electronic device 100 may also display a screen 922 that prompts the user to unlock.

Figure 10:
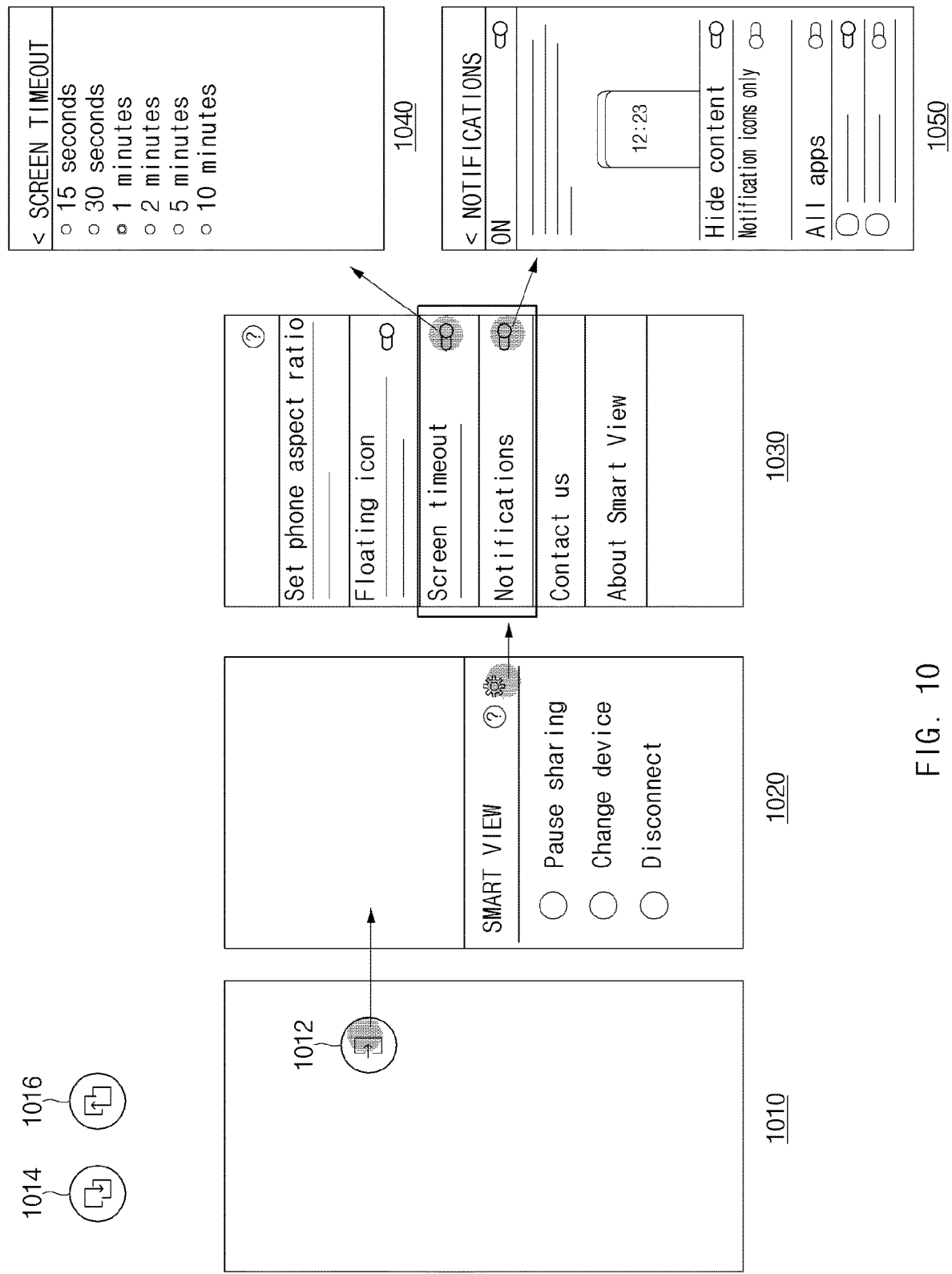
FIG. 10 is a diagram illustrating an example personal protection function provided by an electronic device according to various embodiments.

FIG. 10 is a diagram illustrating an example personal protection function provided by an electronic device according to various embodiments.

In various embodiments, when the screen mirroring function is initiated by the peripheral device 200, the electronic device 100 may provide various functions for enhancing privacy protection.

With reference to a screen 1010, the electronic device 100 may display an icon 1012 indicating that the screen mirroring function is currently being executed. The electronic device 100 may display information, through the icon 1012, about whether the current screen mirroring function is requested and performed from the peripheral device 200 or requested and performed from the electronic device 100. For example, in the former case, the icon 1012 or an icon 1014 may be displayed. In the latter case, an icon 1016 may be displayed. The electronic device 100 may display shapes of the icons differently for both cases.

With reference to a screen 1020, when the icon 1012 is selected, the electronic device 100 may provide a menu related to the currently performed screen mirroring function. For example, the menu, such as stop/change device/disconnect with respect to the screen mirroring function may be provided.

With reference to a screen 1030, the electronic device 100 may provide a detailed setting screen for the screen mirroring function. For example, with respect to the privacy protection, the electronic device 100 may provide detailed setting items for "automatic screen off function" (e.g., "Screen timeout") and "notification sharing function" (e.g., "Notifications").

In an embodiment, the electronic device 100 may stop transmitting the screen data to the peripheral device 200 when the electronic device does not receive an input for a specified time. The above-mentioned function may be referred to as an automatic screen-off function. With reference to a screen 1040, the time for automatically stopping the transmission of the screen data may be set by the user.

With respect to a screen 1050, a method for sharing that the notification occurred at the electronic device 100 (e.g. display the notification without the detail, display only the fact that the notification occurred) and an application program for sharing the notification may be set by the user.

In various embodiments, contents set in the detailed setting item of 'automatic screen off function' and 'notification sharing function' may be applied only when the electronic device 100 receives the screen mirroring request from the external peripheral device 200. Since the risk of exposure of the personal information is relatively small when the screen mirroring request is made from the electronic device 100, the setting of the setting item may be applied only when the screen mirroring request is received from the outside, and the screen data is automatically transmitted.

While the present disclosure has been illustrated and described with reference to various example embodiments thereof, it will be understood by those skilled in the art that various changes in form and details may be made therein without departing from the spirit and scope of the present disclosure as defined, for example, by the appended claims and their equivalents.

Figure 11:
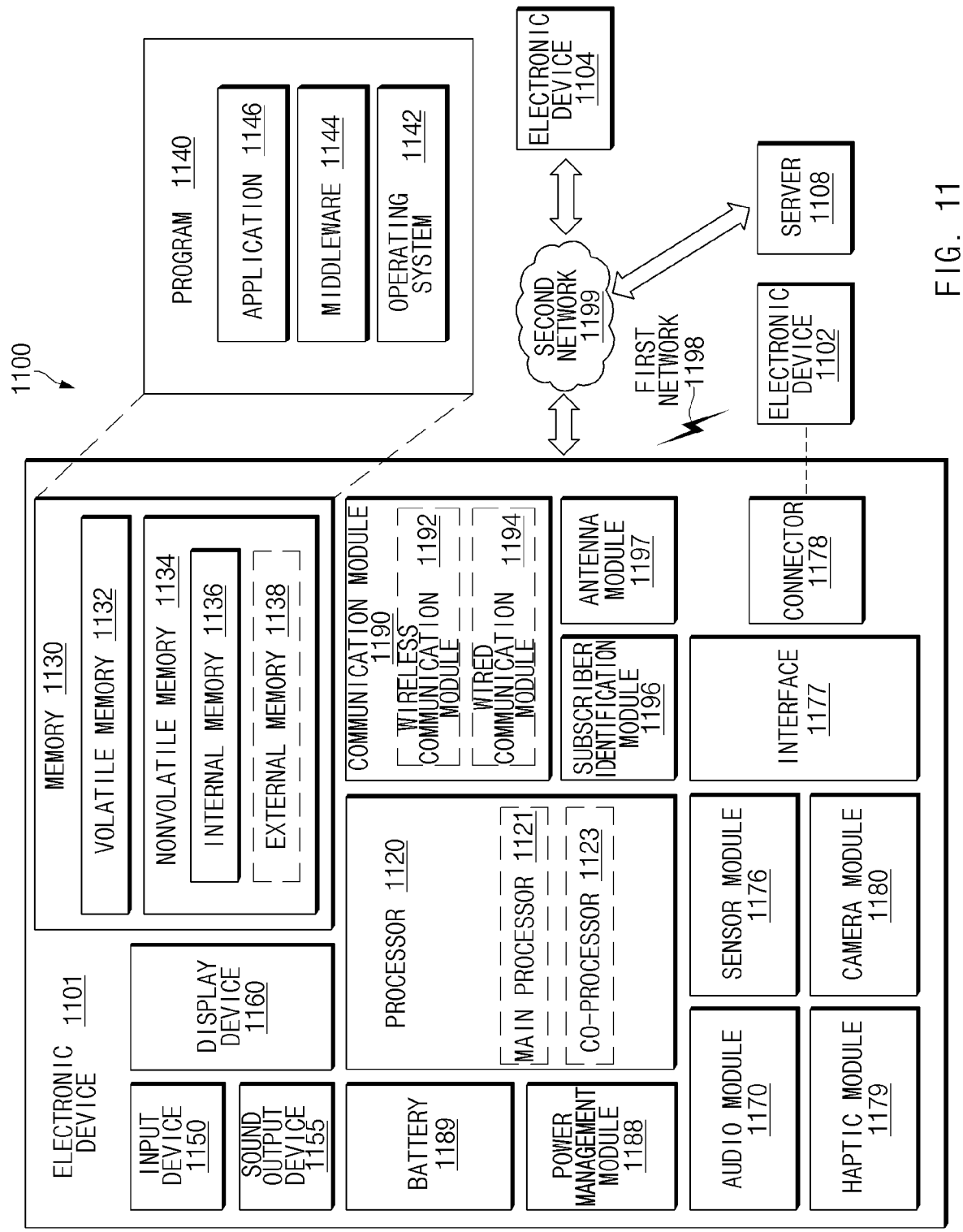
FIG. 11 is a block diagram illustrating an electronic device in a network environment 1100 according to various embodiments.

FIG. 11 is a block diagram illustrating an electronic device 1101 in a network environment 1100 according to various embodiments. Referring to FIG. 11, the electronic device 1101 (e.g., electronic device 100, external peripheral device 200 of FIG. 1) in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120 and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by another component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150 or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a display;
    a communication circuit configured to communicate with a first peripheral device;
    a memory; and
    a processor,
    wherein the processor is configured to control the electronic device to:
        transmit a request for first authentication information associated with a first peripheral device to a server;
        receive the first authentication information from the server;
        store the first authentication information in the memory;
        broadcast a first message via the communication circuit;
        receive a connection request message from the first peripheral device receiving the first message;
        authenticate the first peripheral device based on the first authentication information stored in the memory and associated with the first peripheral device in response to the reception of the connection request message; and
        transmit screen data being displayed on the display to the first peripheral device via the communication circuit based on the authentication being valid.

2. The electronic device of claim 1, wherein the first authentication information includes a first authentication certificate received from the first peripheral device, and
    wherein the processor is further configured to control the electronic device to authenticate the first peripheral device based on the first authentication certificate.

3. The electronic device of claim 1, wherein the memory is configured to store an authentication certificate associated with at least one peripheral device, and
    wherein the processor is further configured to control the display to provide an indication that the at least one peripheral device corresponding to the stored an authentication certificate is connectable to the electronic device.

4. The electronic device of claim 1, wherein the processor is further configured to control the electronic device to broadcast the first message a plurality of times at a predetermined period.

5. The electronic device of claim 1, wherein the processor is further configured to control the electronic device to stop the transmission of the screen data to the first peripheral device based on the electronic device not receiving an input from the first peripheral device for a specified time.

6. The electronic device of claim 1, wherein the memory is configured to store setting information associated with the first peripheral device.

7. The electronic device of claim 1, wherein the processor is further configured to control the electronic device to transmit data associated with a notification event to the first peripheral device based on setting information about the first peripheral device based on the notification event associated with an execution of a function of the electronic device occurring.

8. The electronic device of claim 7, wherein the setting information includes setting information on whether to transmit data associated with the notification event to the first peripheral device.

9. The electronic device of claim 8, wherein the memory is configured to store a plurality of application programs, and
wherein the setting information includes setting information for each of the plurality of application programs on whether to transmit data associated with the notification event occurring from each of the plurality of application programs.

10. The electronic device of claim 7, wherein the processor is further configured to control the electronic device to transmit the screen data to the first peripheral device based on the authentication being valid and screen mirroring with the first peripheral device being determined to be allowed based on the setting information.

11. The electronic device of claim 1, wherein the communication circuit is further configured to communicate with a second peripheral device,
wherein the memory is configured to store authentication information associated with the second peripheral device,
wherein the processor is further configured to control the electronic device to:
transmit a second connection request message to the second peripheral device; and
transmit the screen data being displayed on the display to the second peripheral device based on a confirmation message being received from the second peripheral device as a response to the second connection request message.

12. The electronic device of claim 11, wherein the processor is further configured to control the electronic device to:
display a first icon on the display while transmitting the screen data to the first peripheral device, wherein the first icon indicates that the screen data is being transmitted to the first peripheral device; and
display a second icon on the display while transmitting the screen data to the second peripheral device, wherein the second icon indicates that the screen data is being transmitted to the second peripheral device.

13. The electronic device of claim 1, wherein the processor is further configured to control the electronic device to:
receive authentication information associated with unlocking the electronic device from the first peripheral device; and
change a state of the electronic device from a locked state to an unlocked state based on the authentication information.

14. The electronic device of claim 13, wherein the authentication information associated with unlocking the electronic device includes at least one of: a specific content utterance, and a specific numeral string.

15. A method performed by an electronic device, the method comprising:
transmitting a request for first authentication information associated with a first peripheral device to a server;
receiving the first authentication information from the server;
storing the first authentication information in memory of the electronic device;
broadcasting a first message via a communication circuit;
receiving a connection request message from a first peripheral device receiving the first message;
authenticating the first peripheral device based on the stored first authentication information associated with the first peripheral device in response to the reception of the connection request message; and
transmitting screen data being displayed on a display of the electronic device to the first peripheral device via the communication circuit based on the authentication being valid.

16. The method of claim 15, wherein the first authentication information includes a first authentication certificate received from the first peripheral device, and
wherein the authenticating of the first peripheral device includes authenticating the first peripheral device based on the first authentication certificate.

17. The method of claim 15, wherein broadcasting of the first message includes broadcasting the first message a plurality of times at a predetermined period.

18. The method of claim 15, further comprising stopping the transmission of the screen data to the first peripheral device based on the electronic device not receiving an input from the first peripheral device for a specified time.

19. The method of claim 15, further comprising:
transmitting a second connection request message to a second peripheral device; and
transmitting the screen data being displayed on the display to the second peripheral device based on a confirmation message being received from the second peripheral device as a response to the second connection request message.

20. The method of claim 19, further comprising:
displaying a first icon on the display while transmitting the screen data to the first peripheral device, wherein the first icon indicates that the screen data is being transmitted to the first peripheral device; and
displaying a second icon on the display while transmitting the screen data to the second peripheral device, wherein the second icon indicates that the screen data is being transmitted to the second peripheral device.

* * * * *